US010009972B2

United States Patent
Clawson, Jr. et al.

(10) Patent No.: US 10,009,972 B2
(45) Date of Patent: Jun. 26, 2018

(54) MULTIPHASE LIGHT FIXTURE

(71) Applicant: Hubbell Incorporated, Shelton, CT (US)

(72) Inventors: Thomas N. Clawson, Jr., Boiling Springs, SC (US); T. Warren Weeks, Jr., Simpsonville, SC (US); Chris Bailey, Greenville, SC (US); Douglas M. Hamilton, Arlington Heights, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days. days.

(21) Appl. No.: 15/427,252

(22) Filed: Feb. 8, 2017

(65) Prior Publication Data

US 2017/0231049 A1 Aug. 10, 2017

Related U.S. Application Data

(60) Provisional application No. 62/292,437, filed on Feb. 8, 2016.

(51) Int. Cl.
H05B 41/16 (2006.01)
H05B 33/08 (2006.01)
(Continued)

(52) U.S. Cl.
CPC ........ H05B 33/0845 (2013.01); H02M 1/14 (2013.01); H02M 7/068 (2013.01);
(Continued)

(58) Field of Classification Search
CPC .................................................. H05B 41/24
(Continued)

(56) References Cited

U.S. PATENT DOCUMENTS 4,441,055 A * 4/1984 Balchjunas .......... H05B 41/042
315/189
8,461,774 B2 6/2013 Nerone
(Continued)

FOREIGN PATENT DOCUMENTS

CN 105120562 12/2015
WO WO 2015/049415 4/2015

OTHER PUBLICATIONS

Gamit et al. "Multi Pulse Rectifier using different phase shifting transformers and its THD comparison for power quality" International Research Journal of Engineering and Technology (IRJET), vol. 3, Issue: 1, Jan. 2016; pp. 1025-1033.*
(Continued)

Primary Examiner — Thuy Vinh Tran
(74) Attorney, Agent, or Firm — Dority & Manning, P.A.

(57) ABSTRACT

Multiphase lighting fixtures having one or more light emitting diode (LED) light sources are provided. In one example implementation, a light fixture includes one or more light sources, such as LED light sources and a power conversion circuit. The power conversion circuit includes a phase shifting transformer for implementing a phase shift between output phases of secondary windings thereof, a multi-phase rectifier having a first rectifier and a second rectifier connected in parallel for converting a multiphase input power to a rectified output or a six-pulse configuration, a zero sequence blocking transformer for reducing harmonic distortion, an interphase transformer for further reducing harmonic distortion, and a current regulator for providing a constant DC current output to the one or more light sources. In some example implementations, the DC rectified output has a voltage ripple of less than about 7%, or less than about 3%.

10 Claims, 7 Drawing Sheets

(51) Int. Cl.
*H02M 7/10* (2006.01)
*H02M 1/14* (2006.01)
*H02M 7/06* (2006.01)
*H05B 41/24* (2006.01)

(52) U.S. Cl.
CPC .......... *H02M 7/10* (2013.01); *H05B 33/0809* (2013.01); *H05B 41/24* (2013.01)

(58) Field of Classification Search
USPC ............. 315/137, 139, 141, 185 R, 194, 291
See application file for complete search history.

(56) References Cited

U.S. PATENT DOCUMENTS

| | | |
|---|---|---|
| 9,445,472 B2 * | 9/2016 | Lo ..................... H05B 33/0845 |
| 9,462,648 B2 * | 10/2016 | Lo ..................... H05B 33/0845 |
| 2010/0315252 A1 | 12/2010 | Desphande et al. |
| 2011/0080112 A1 | 4/2011 | Shearer et al. |
| 2013/0169165 A1 | 7/2013 | Sadwick et al. |
| 2013/0169180 A1 | 7/2013 | Park et al. |
| 2014/0035469 A1 | 2/2014 | Yang |
| 2014/0218982 A1 | 8/2014 | Abdollahi |
| 2014/0340950 A1 | 11/2014 | Ganev et al. |

OTHER PUBLICATIONS

Abdollahi et al. "Application of Pulse Doubling in Star-Connected Autotransformer Based 12-Pulse AC-DC Converter for Power Quality Improvement," International Journal of Electrical, Computer, Energetic, Electronic and Communication Engineering, vol. 5, No. 8, 2011, pp. 1093-1101.
PCT International Search Report for corresponding PCT Application No. PCT/US2017/016886, dated May 10, 2017—2 pages.

* cited by examiner

MULTIPHASE LIGHT FIXTURE

PRIORITY CLAIM

The present application claims the benefit of priority of U.S. Provisional Application Ser. No. 62/292,437, titled "Multiphase Light Fixture," filed Feb. 8, 2016, which is incorporated herein by reference.

FIELD

The present disclosure relates generally to lighting systems, and more particularly light emitting diode (LED) and other solid state lighting systems.

BACKGROUND

Light emitting diode (LED) lighting systems can include one or more LED devices that become illuminated as a result of the movement of electrons through a semiconductor material. LED devices are becoming increasingly used in many lighting applications and have been integrated into a variety of products, such as light fixtures, flashlights, and other illumination products. LED lighting systems can provide increased efficiency, life and durability, can produce less heat, and can provide other advantages relative to traditional incandescent and fluorescent lighting systems. Moreover, the efficiency of LED lighting systems has increased such that higher power can be provided at lower cost to the consumer.

Light fixtures including one or more LED devices can include power conversion circuits for converting alternating current (AC) input power from a power source to a suitable power (e.g., direct current (DC) power) for powering the one or more LED devices. A factor in powering LED light sources and other light sources is the presence of flicker caused by varying electrical signals provided to the LED light sources. The presence of flicker in light sources can be aesthetically displeasing and otherwise undesirable if noticeable to consumers.

SUMMARY

Aspects and advantages of embodiments of the present disclosure will be set forth in part in the following description, or may be learned from the description, or may be learned through practice of the embodiments.

One example aspect of the present disclosure is directed a light fixture. The light fixture includes one or more light sources, such as LED light sources. The light fixture includes a power conversion circuit. The power conversion circuit can be configured to receive a multiphase input power comprising three or more alternating current (AC) phases. The power conversion circuit can be further configured to convert the multiphase input power to rectified output for powering the one or more light sources. In some example implementations, the DC rectified output can have a voltage ripple of less than about 7%, such as less than about 3%.

Another example aspect of the present disclosure is directed to a power conversion circuit for powering one or more LED devices from a multiphase AC power source. The power conversion circuit can include a multi-pulse multiphase rectifier configured to convert an input multiphase power to a rectified output power. The rectified output power can have a voltage ripple of less than about 7%, such as less than about 3%. In some embodiments, the multi-pulse, multiphase rectifier can include a transformer and one or more rectifier circuits. The power conversion circuit can further include a regulator circuit coupled to the multi-pulse, multiphase rectifier such that the regulator circuit receives the rectified output power. The regulator circuit can be configured to provide a constant current powering one or more LED devices.

Another example aspect of the present disclosure can be directed to a light fixture having one or more LED light sources. The light fixture can further include means for converting a multiphase input power having three or more phases to a rectified output for powering the one or more LED light sources such that the rectified output has a voltage ripple of less than about 7%.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
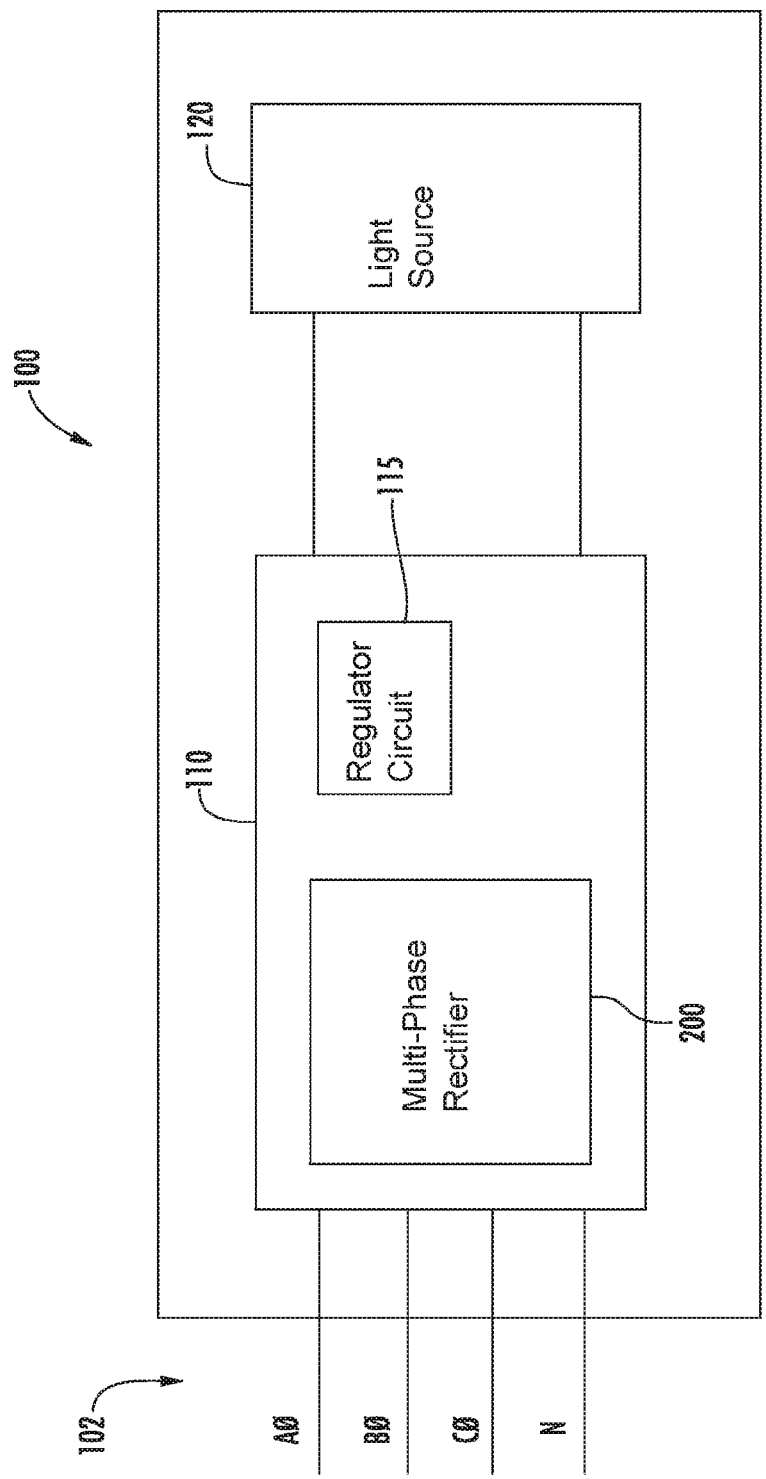
FIG. 1 depicts an overview of an example multiphase light fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to light fixtures having solid state lighting devices (e.g., LED devices) that can be powered by multiphase AC power. More particularly, a light fixture can include a power conversion circuit that is configured convert a multiphase input power (e.g., three phase AC power) having three or more AC phases to a suitable output for powering one or more light sources (e.g., LED light sources). In some embodiments, multiphase AC power can be rectified using a multi-pulse, multiphase rectifier to generate a rectified output. The rectified output can be provided to one or more regulator circuits (e.g., one or more current regulators and/or voltage regulators) to maintain a constant output for powering the one or more light sources.

In some embodiments, the power conversion circuit can be configured to receive a three-phase input power comprising three AC phases and, in some embodiments, a neutral. The power conversion circuit can be configured to convert the three-phase input power to a DC output for powering one or more LED devices. The power conversion circuit can include a multi-pulse three-phase bridge rectifier. The multi-pulse three-phase bridge rectifier can include a phase shifting transformer and one or more rectifier circuits. The phase-shifting transformer can provide a phase shift between one or more outputs of the phase shifting transformer. The outputs can be rectified to provide a rectified output with reduced ripple without the use of filtering capacitors. For instance, the voltage ripple of the rectified output can be less than 7%, such as less than 3%. The rectified output, via one or more regulator circuit(s), can power the one or more light sources such that the one or more light sources operate with reduced percent flicker, such as a percent flicker of less than about 7%, such as less than about 3%, such as about 1.8%.

More particularly, in some embodiments, the multi-pulse, multiphase bridge rectifier includes a twelve-pulse, three-phase bridge rectifier having a phase shifting transformer. The phase shifting transformer can include a primary and a secondary. The primary can have primary winding. The secondary can have a first secondary winding and a second secondary winding. The phase shifting transformer can provide a phase shift (e.g., about a 30° phase shift) between an output of the first primary winding and an output of the second primary winding. The output of the first secondary winding can be provided to a first rectifier circuit. The output of the second secondary winding can be provided to a second rectifier circuit. The first rectifier circuit can be coupled in series with the second rectifier circuit to provide a rectified output of the twelve-pulse three-phase bridge rectifier. The rectified output can be provided to a regulator circuit (e.g., current regulator or voltage regulator) to provide a constant current for powering one or more LED devices.

In this way, a light fixture according to example embodiments of the present disclosure can accommodate multiphase power having three or more alternating current phases to provide a rectified output for powering the one or more light sources (e.g., LED devices) with reduced voltage ripple. The use of a multi-pulse, multiphase bridge rectifier can provide for low ripple in the DC output with reduced total harmonic distortion without the need for thermally sensitive devices, such as filtering capacitors. As a result, the light fixture can be operated in high temperature environments with reduced lifetime degradation.

As used herein, a "lighting system" can include, but is not limited to, one or more of a lighting circuit, light engine, one or more light fixtures (i.e., luminaires), a plurality of lighting devices arranged in an environment, a combination of any of the foregoing, or other system used to provide illumination. A "light fixture" or "luminaire" refers to a device used to provide light or illumination using one or more light sources. "Percent flicker" (% F) is calculated using a maximum instantaneous light output (A) and a minimum instantaneous light output (B) as follows: % F=100%*(A−B)/(A+B). "Ripple" is calculating using a maximum instantaneous voltage (A) and a minimum instantaneous voltage (B) as follows: % ripple=100%*(A−B)/(A+B). The term "about" or "approximately" when used in conjunction with a numerical value refers to within 35% of the stated numerical value.

FIG. 1 depicts an overview of an example light fixture 100 according to example embodiments of the present disclosure. The light fixture 100 can include a housing used to house various components of the light fixture 100. The light fixture 100 can also include various heat sinks and other thermally conductive devices to manage thermal properties of the light fixture 100. The light fixture 100 can further include various optics, lenses, reflectors, and other elements to provide desired lighting effects (e.g., down lighting, up lighting, accent lighting, area lighting, etc.). The light fixture 160 can also include various mechanical elements to mount the light fixture 160 in a desired location (e.g., wall mount, ceiling mount, pendant mount, recessed, pole mount, etc.). In some embodiments, the light fixture 100 can be a high bay light fixture.

The light fixture 100 can be configured to receive a multiphase input power from a power source (not shown). The input power can include three or more AC phases. In the example of FIG. 1, the input power can include an A-phase (Aϕ), a B-phase (Bϕ), a C-phase (Cϕ), and a neutral (N). In some embodiments, the multiphase input power can be a 480V three-phase input power.

Example aspects of the present disclosure are discussed with reference to a three-phase input power having three AC phases and a neutral for purposes of illustration and discussion. Those of ordinary skill in the art, using the disclosures provided herein, will understand that other suitable multiphase input power can be used without deviating from the scope of the present disclosure, such as a three-phase input power without a neutral, or an input power having four or more AC phases.

The multiphase input power can be provided via a suitable multiphase input connection 102 to the light fixture 100. The multiphase input connection 102 can accommodate, for instance, a five wire three-phase input including three conductors for each of the A-phase, B-phase, and C-phase, a neutral conductor, and a ground conductor (not shown). In some embodiments, the multiphase input connection 102 can accommodate a 480V five wire three-phase input.

The light fixture 100 includes a power conversion circuit 110 and one or more light sources 120. In some embodiments, the light sources 120 can include one or more LED devices or other solid state lighting devices. The one or more LED devices can be configured to emit light as a result of electrons moving through a semiconductor material. The LED device(s) can be associated with a variety of different colors, different color temperatures, different brightness, different intensities, different lighting directions and/or other characteristics. The LED device(s) can be configured to emit electromagnetic energy at a variety of ranges of wavelengths including wavelengths across both visible and non-visible portions of the electromagnetic spectrum.

The power conversion circuit 110 can be configured to convert the multiphase input power to a suitable output for powering the one or more lighting sources 120. For instance, the power conversion circuit 110 can include means for converting the multiphase input power to a rectified output for powering one or more LED devices with reduced voltage ripple, such as a voltage ripple of less than about 7%, such as less than about 3%. Example power conversion circuits including example means for converting a multiphase input power according to example embodiments of the present disclosure will be discussed below.

The power conversion circuit 110 of FIG. 1 includes a multi-pulse, multiphase rectifier 200 and a regulator circuit 115. The multi-pulse, multiphase rectifier 200 can convert the multiphase input power to a rectified output. In some embodiments, the multi-pulse, multiphase rectifier can generate a rectified output with reduced variation between a maximum instantaneous rectified output and a minimum instantaneous rectified output by implementing one or more phase shifts between AC outputs of the multiphase input and rectifying the AC outputs. Example multi-pulse, multiphase rectifiers 200 that can be used according to example aspects of the present disclosure will be discussed with reference to FIGS. 2-5.

The power conversion circuit 110 of FIG. 1 further includes a regulator circuit 115. The regulator circuit 115 can be, for instance, a current regulator and/or voltage regulator configured to provide a constant DC output (e.g., a constant DC current) to the one or more light sources 120. The regulator circuit can include, for instance, suitable components for providing a constant current and/or a constant voltage to the one or more light sources 120. In some example embodiments, the regulator circuit 115 can include, for instance, a constant current regulator (CCR) device or a power MOSFET with current feedback to maintain a constant current. In some embodiments, the regulator circuit can include additional MOSFETs for op-amps in communication with the current regulator. A lighting control signal (e.g., 0-10 V lighting control signal, DALI lighting control signal, DMX lighting control signal, etc.) can be provided to the regulator circuit 115 to control the amount of current provided to the one or more light source 120, providing for dimming capability of the power conversion circuit 110.

Figure 2:
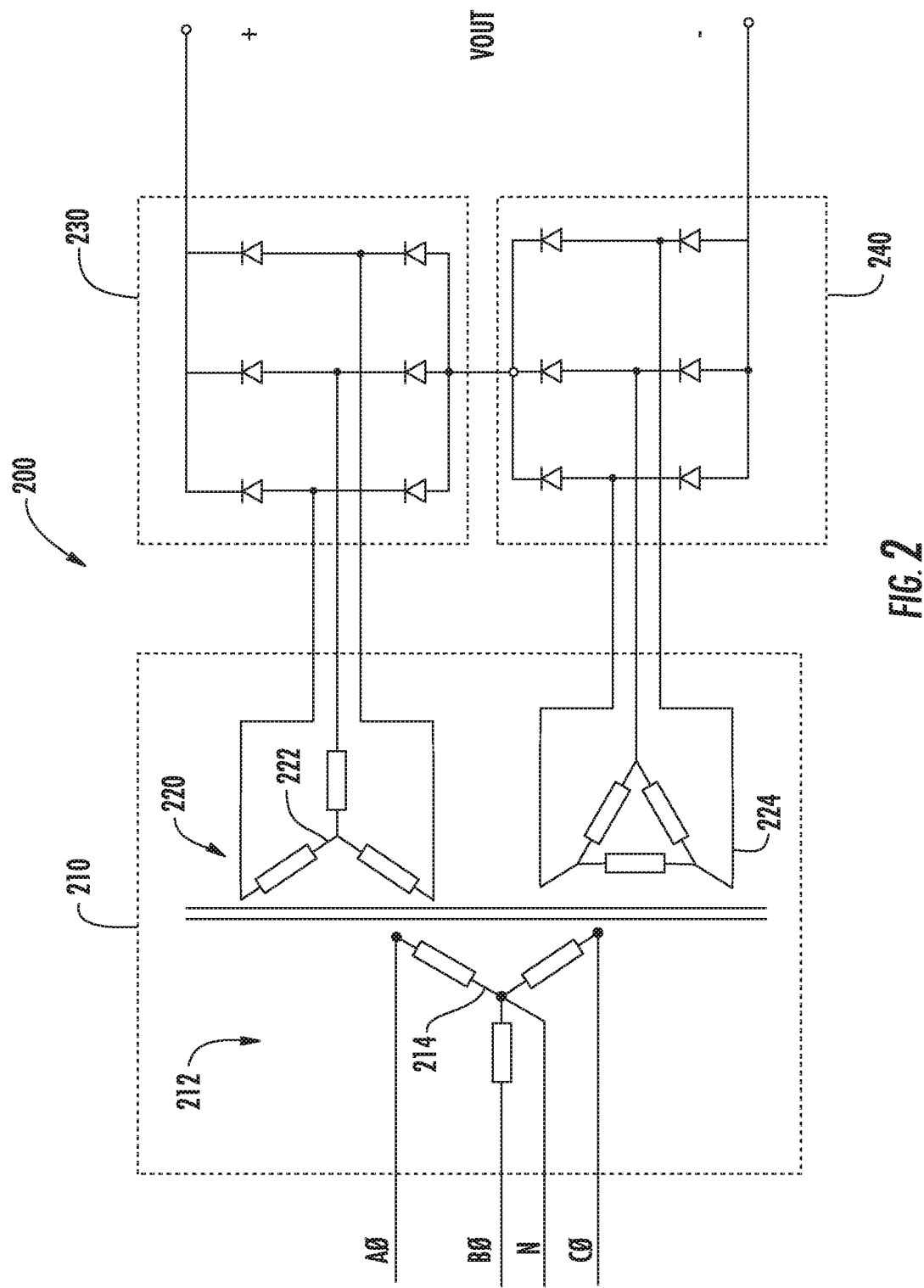
FIG. 2 depicts a circuit diagram of an example multi-pulse, multiphase rectifier according to example embodiments of the present disclosure.

FIG. 2 depicts an example multi-pulse, multiphase rectifier 200 according to example embodiments of the present disclosure. The multi-pulse, multiphase rectifier 200 of FIG. 2 is a twelve-pulse, three-phase bridge rectifier. In this example embodiment, the rectifier 200 includes a phase shifting transformer 210 and a plurality of rectifier circuits 230 and 240.

The phase shifting transformer 210 is configured to implement a phase shift (e.g., an about a 30° phase shift) between output phases of the secondary windings of the transformer 210. More particularly, the phase shifting transformer 210 can include a primary 212 and a secondary 220. The primary 210 can include a primary winding 214. The primary winding 214 can have a wye configuration to accommodate three AC phases and a neutral (e.g., Aϕ, Bϕ, Cϕ, N). In other embodiments, the primary winding 214 can have a delta configuration to accommodate three AC phases without a neutral.

Figure 3:
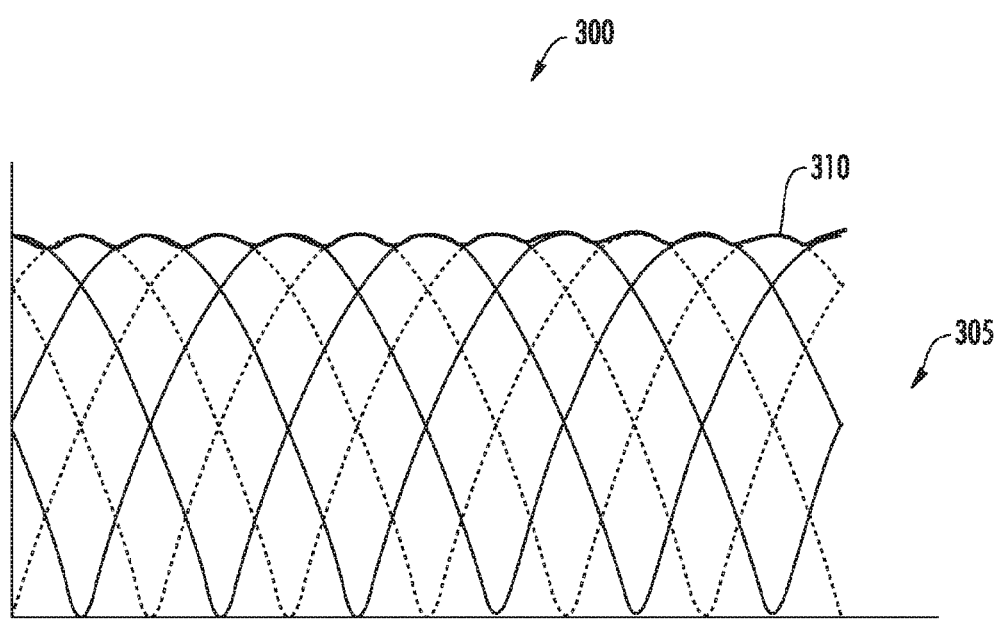
FIG. 3 depicts a graphical representation of an example rectified output according to example embodiments of the present disclosure.

The secondary 220 can have a first secondary winding 222 and a second secondary winding 224. The first secondary winding 222 can have a wye configuration. The second secondary winding 224 can have a delta configuration. The phase shifting transformer 210 can be configured to implement an about a 30° phase shift or other suitable phase shift between the output of first secondary winding 222 and the output of the second secondary winding 224. FIG. 3 depicts a graphical representation plurality of output waveforms 205 of the primary winding 222 and the secondary winding 224 wherein the output of the first secondary winding 222 is out of phase by about 30° relative to the output of the second secondary winding 224.

As shown in FIG. 2, the twelve-pulse, three-phase bridge rectifier 200 includes a plurality of rectifier circuits 230 and 240. More particularly, a first rectifier 230 is coupled to the first secondary winding 232. A second rectifier 240 is coupled to the second secondary winding 224. The first rectifier 230 and the second rectifier 240 are coupled in series with one another. Each of the first rectifier 230 and the second rectifier 240 are full bridge rectifiers. The full bridge rectifiers include a plurality of diodes for full wave rectification of each phase of the alternating current output of the phase shifting transformer 210. The first rectifier 230 and the second rectifier 240 coupled in series provide rectified output Vout.

In some embodiments, the first rectifier 230 and the second rectifier 240 can be coupled in parallel if an interphase transformer is used on the outputs of the first rectifier 230 and the second rectifier 240. However, coupling the first rectifier 230 and the second rectifier 240 in series can lead to reduced total harmonic distortion.

FIG. 3 depicts a graphical representation of the rectified output provided by the twelve-pulse, three-phase bridge rectifier 200 of FIG. 2. More particularly, waveform 310 depicts the rectified output provided by the twelve-pulse, three-phase bridge rectifier 200. As shown, ripple in the rectified output is relatively low, such as less than 7%.

As demonstrated, the twelve-pulse, three-phase bridge rectifier can provide a rectified output with reduced ripple without requiring the use of filtering capacitors. Filtering capacitors can be subject to thermal degradation if operated in high ambient temperature environments. By reducing the need for filtering capacitors, the power conversion circuit according to example aspects of the present disclosure can be operated in high ambient temperature environments with reduced degradation.

Example aspects of the present disclosure are discussed with reference to a twelve-pulse, three-phase bridge rectifier for purposes of illustration and discussion. Other multipulse, multiphase bridge rectifiers can be used without deviating from the scope of the present disclosure.

Figure 4:
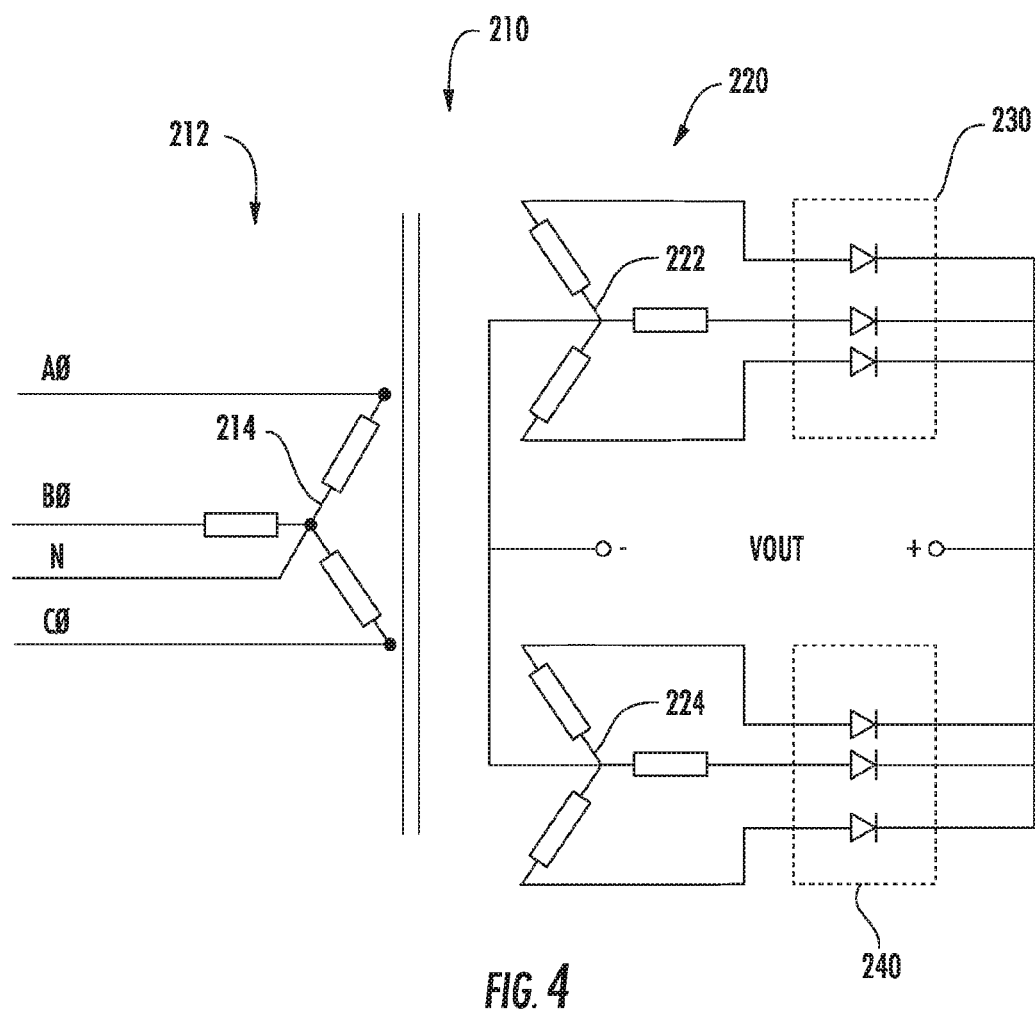
FIG. 4 depicts a circuit diagram of an example multi-pulse, multiphase rectifier according example embodiments of the present disclosure.

As one example, FIG. 4 depicts one example six-pulse three-phase rectifier that can be used as the multi-pulse, multiphase rectifier 200 according to example embodiments of the present disclosure. Similar to rectifier 200 of FIG. 2, the rectifier 200 of FIG. 4 includes a transformer 210 having a primary 212 and a secondary 220. The primary 212 has a primary winding 214. The primary winding 214 can have a wye configuration to accommodate three AC phases and a neutral (e.g., Aϕ, Bϕ, Cϕ, N). In other embodiments, the primary winding 214 can have a delta configuration to accommodate three AC phases without a neutral.

The secondary can have a first secondary winding 222 and a second secondary winding 224. Each of the first secondary winding 222 and the second secondary winding can have a wye configuration. The first secondary winding 222 and the second secondary winding 224 can be connected in antiphase. The output of the first secondary winding 222 can be provided to a first rectifier 230. The output of the second secondary winding 224 can be provided to a second rectifier 240. The first rectifier 230 and the second rectifier 240 can each be half-wave rectifiers. The first rectifier 230 and the second rectifier 240 can be connected in parallel with one another to provide a six-pulse configuration.

Figure 5:
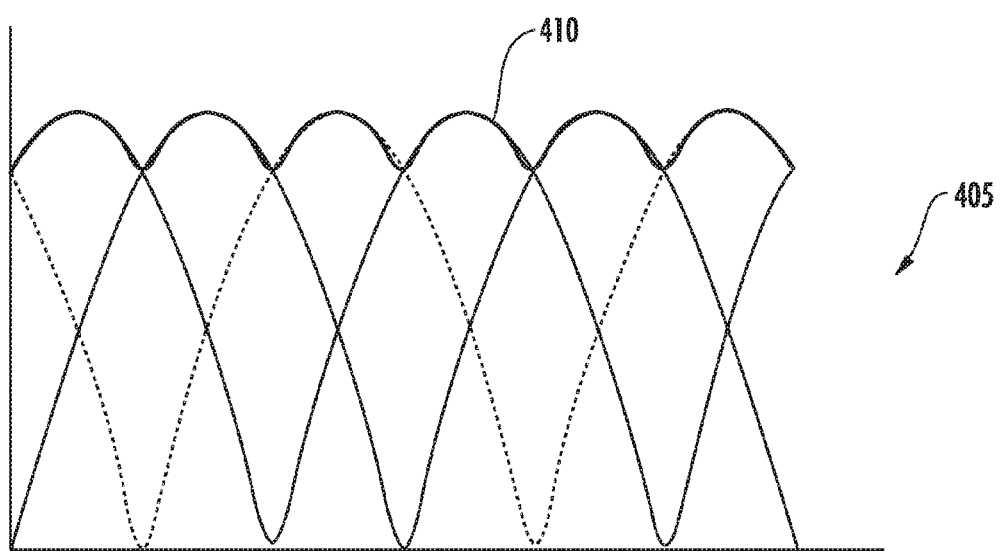
FIG. 5 depicts a graphical representation of an example rectified output according to example embodiments of the present disclosure.

FIG. 5 depicts a graphical representation of the rectified output of the six-pulse, three-phase rectifier of FIG. 4. In the six-pulse configuration, negative cycles of the input power are rectified and added to the rectified output Vout to provide an additional set of pulses that are about 180° out of phase with the input power as shown by the plurality of output waveforms 405. Waveform 410 depicts the rectified output provided by the six-pulse, three-phase rectifier 200 of FIG. 4. As shown, ripple in the rectified output 410 is relatively low, leading to reduced percent flicker in one or more light sources powered by the rectified output.

Figure 6:
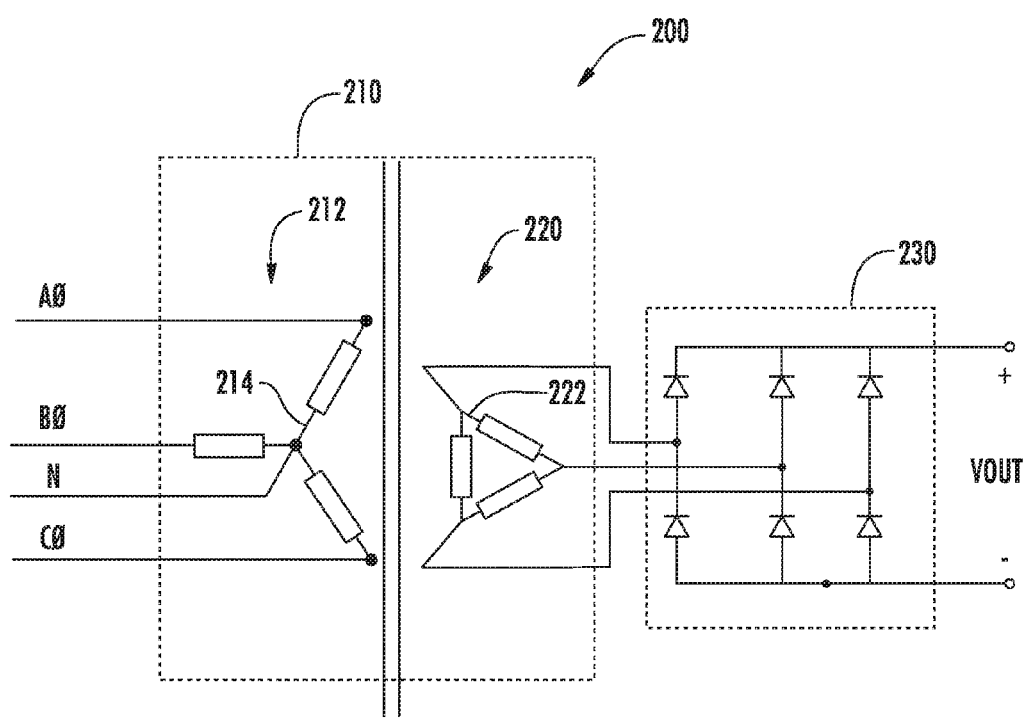
FIG. 6 depicts a circuit diagram of an example multi-pulse, multiphase rectifier according to example embodiments of the present disclosure.

FIG. 6 depicts another example six-pulse three-phase rectifier that can be used as the multi-pulse, multiphase rectifier 200 according to example embodiments of the present disclosure. The rectifier 200 of FIG. 4 includes a transformer 210 having a primary 212 and a secondary 220. The primary 212 has a primary winding 214. The primary winding 214 can have a wye configuration to accommodate three AC phases and a neutral (e.g., Aφ, Bφ, Cφ, N).

The secondary can have a secondary winding 222. The secondary winding 222 can, in some embodiments, have a delta configuration. The output of the secondary winding 222 can be coupled to a full-wave rectifier circuit 230. The full-wave rectification provides for six-pulse three-phase rectification of the input three-phase power.

The multi-pulse, multiphase rectifier according to example embodiments of the present disclosure can also be implemented using, for instance, 18-pulse, 24-pulse, 48-pulse and 60-pulse three-phase bridge rectifiers. In some embodiments, these multi-pulse, multiphase rectifiers can be implemented by coupling a plurality of twelve-pulse, three-phase rectifiers in parallel or series. Other implementations of the rectifiers can be used without deviating from the scope of the present disclosure. In still other embodiments, the power conversion circuit can be implemented using a multiphase rectifier (e.g. a three-phase rectifier) that is not necessarily a multi-pulse rectifier. For instance, a three-phase half bridge rectifier can be used in a power conversion circuit.

Figure 7:
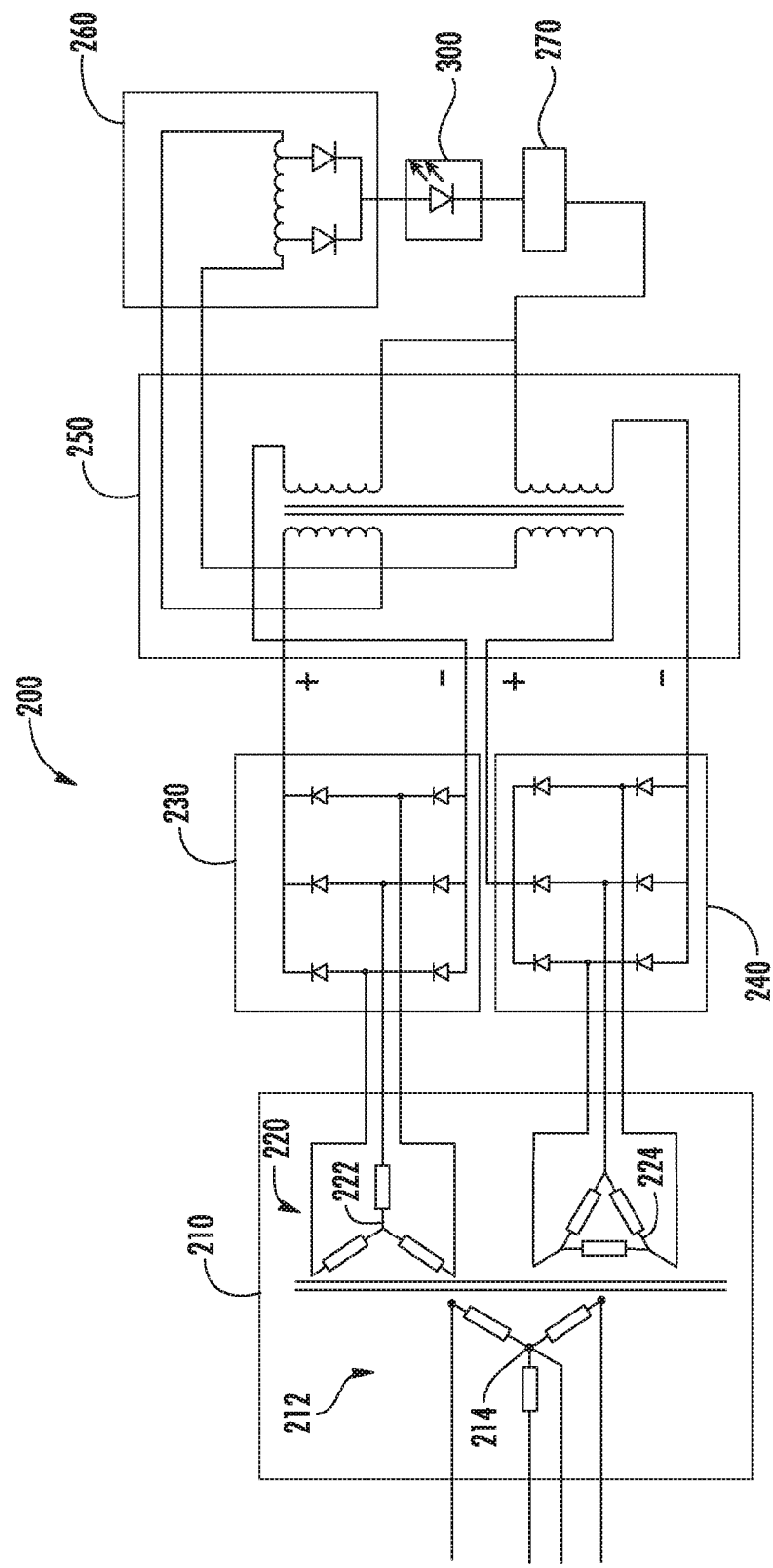
FIG. 7 depicts a circuit diagram of an example multi-pulse, multiphase rectifier according to example embodiments of the present disclosure.

FIG. 7 depicts another example multi-pulse, multiphase rectifier 200 according to example embodiments of the present disclosure. Similar to rectifier 200 of FIG. 2, the rectifier 200 of FIG. 7 includes a transformer 210 having a primary 212 and a secondary 220. The transformer 210 can be an autotransformer. The primary 212 has a primary winding 214. The primary winding 214 can have a wye configuration to accommodate three AC phases and a neutral (e.g., Aφ, Bφ, Cφ, N). In other embodiments, the primary winding 214 can have a delta configuration to accommodate three AC phases without a neutral.

The secondary can have a first secondary winding 222 and a second secondary winding 224. Each of the first secondary winding 222 and the second secondary winding can have a wye configuration. The first secondary winding 222 and the second secondary winding 224 can be connected in antiphase. The output of the autotransformer 210 can be a 6 pulse output.

The output of the first secondary winding 222 can be provided to a first rectifier 230. The output of the second secondary winding 224 can be provided to a second rectifier 240. The first rectifier 230 and the second rectifier 240 can each be full wave rectifiers. The first rectifier 230 and the second rectifier 240 can be connected in parallel with one another to provide a twelve-pulse output.

The output of the parallel rectifiers 230 and 240 can be coupled to a zero sequence blocking transformer 250. The zero sequence blocking transformer 250 can allow for the parallel configuration of the rectifiers 230 and 240. The zero sequence blocking transformer 250 can also reduce total harmonic distortion and allow for balancing of the current output of the parallel rectifiers 230 and 240.

An interphase transformer 260 can convert the twelve-pulse output to a twenty-four pulse output. The interphase transformer 260 can also be used to reduce total harmonic distortion. The output of the interphase transformer 260 can power one or more LED loads 300 (e.g., LED arrays having one or more LED devices). A current regulator 270 can be used to regulate the current through the LED load 300.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light fixture, comprising:
   one or more light emitting diode (LED) light sources;
   a power conversion circuit, the power conversion circuit configured to receive a multiphase input power comprising three or more alternating current phases and to convert the multiphase input power to a rectified output for powering the one or more LED light sources;
   wherein the power conversion circuit comprises a multi-pulse, multiphase rectifier, the multi-pulse, multiphase rectifier having a first rectifier and a second rectifier coupled in parallel, the multi-pulse multiphase rectifier further having a zero sequence blocking transformer coupled to the first rectifier and the second rectifier, a phase shifting transformer having a primary winding, a first secondary winding and a second secondary winding, the first secondary winding coupled to the first rectifier, the second secondary winding coupled to the second rectifier, the multi-pulse multiphase rectifier further comprising an interphase transformer and a current regulator, wherein the current regulator is configured to receive the rectified output and provide a constant current to the one or more light emitting diode (LED) light sources.

2. The light fixture of claim 1 wherein the rectified output for powering the one or more light sources has a voltage ripple.

3. The light fixture of claim 2, wherein the voltage ripple is less than about 7%.

4. The light fixture of claim 2, wherein the voltage ripple is less than about 3%.

5. The light fixture of claim 2, wherein a constant current from the current regulator is generated to power the one or more LED light sources such that the one or more LED light sources have a percent flicker of less than about 7%.

6. The light fixture of claim 2, wherein a constant current from a current regulator is generated to power the one or more LED light sources such that the one or more LED light sources have a percent flicker of less than about 3%.

7. The light fixture of claim 1, wherein the phase shifting transformer is configured to provide about a 30° phase shift between an output of the first secondary winding and the second secondary winding.

8. The light fixture of claim 1, wherein the primary winding has a wye configuration, the first secondary winding has a wye configuration, and the second secondary winding has a delta configuration.

9. The light fixture of claim 1, wherein the light fixture is a high-bay light fixture.

10. The light fixture of claim 1, wherein the interphase transformer configured to provide a twenty-four pulse output.

* * * * *